United States Patent [19]
Takahashi et al.

[11] Patent Number: 6,000,850
[45] Date of Patent: Dec. 14, 1999

[54] DYNAMIC PRESSURE BEARING MADE OF POROUS MATERIAL

[75] Inventors: Takeshi Takahashi, Kashiba; Masayoshi Onishi, Tondabayashi, both of Japan

[73] Assignee: Koyo Seiko Co., Ltd., Osaka, Japan

[21] Appl. No.: 09/056,610

[22] Filed: Apr. 8, 1998

[51] Int. Cl.⁶ ..................................................... F16C 32/06
[52] U.S. Cl. ........................ 384/114; 384/279; 384/292
[58] Field of Search .................................. 384/114, 123, 384/112, 113, 107, 279, 292

[56] References Cited

U.S. PATENT DOCUMENTS

| | | |
|---|---|---|
| 2,855,249 | 10/1958 | Gerard . |
| 3,169,807 | 2/1965 | Abel et al. . |
| 5,520,038 | 5/1996 | Clark et al. . |
| 5,683,183 | 11/1997 | Tanaka et al. .......................... 384/114 |

FOREIGN PATENT DOCUMENTS

| | | |
|---|---|---|
| 0 002 292 | 6/1979 | European Pat. Off. . |
| 0 289 886 | 11/1988 | European Pat. Off. . |
| 32 30 232 A1 | 2/1984 | Germany . |
| 32 48 186 A1 | 7/1984 | Germany . |
| 3326316 A1 | 2/1985 | Germany . |
| 33 39040 A1 | 5/1985 | Germany . |
| 3-71944 | 3/1991 | Japan . |

*Primary Examiner*—Lenard A. Footland
*Attorney, Agent, or Firm*—Wenderoth, Lind & Ponack, L.L.P.

[57] ABSTRACT

The invention provides a dynamic pressure bearing capable of generating enough dynamic pressure even with the use of a porous material. Dynamic pressure grooves at an inner circumferential surface of a sleeve made of porous material are formed by rolling process. Voids of the porous material at a surface of the dynamic pressure grooves are crushed by this rolling process, making the dynamic pressure grooves airtight. Further, the inner circumferential surface at which the dynamic pressure grooves are formed is subject to a sizing process, by which a bearing surface of the sleeve is crushed so that substantially no voids are present.

13 Claims, 1 Drawing Sheet

DYNAMIC PRESSURE BEARING MADE OF POROUS MATERIAL

BACKGROUND OF THE INVENTION

The present invention relates to a dynamic pressure bearing using porous material.

This type of dynamic pressure bearing has conventionally been provided in which a sleeve for supporting a shaft is made by a sintering process of metal powder and in which dynamic pressure grooves are formed by a metal mold pattern for the sintering process.

However, in this conventional dynamic pressure bearing having a sleeve of sintered metal, many pores are present in the sintered metal. Therefore, fluid pressure escapes outside through pores of the dynamic pressure grooves, causing a problem that sufficient dynamic pressure can not be generated.

SUMMARY OF THE INVENTION

Therefore, an object of the present invention is to provide a dynamic pressure bearing capable of generating enough dynamic pressure even with the use of porous material.

In order to achieve the above object, the present invention provides a dynamic pressure bearing in which at least one of a supporting member and a supported member is made of a porous material and in which dynamic pressure grooves are formed on the porous material.

The dynamic pressure grooves are formed by a rolling process. In the rolling process, the porous material at a surface of the dynamic pressure grooves is crushed so that substantially no voids are present in the porous material at the surface of the dynamic pressure grooves.

According to the dynamic pressure bearing of this, invention, since the dynamic pressure grooves are formed by a rolling process on the porous material, the porous material (i.e., the material is free of voids) at the surface of the dynamic pressure grooves is crushed. Consequently, substantially no voids are present in the porous material at the surface of the grooves. Thus, sufficient dynamic pressure can be generated.

In one embodiment, a bearing surface of the supporting member or the supported member in which the dynamic pressure grooves are formed is crushed by a sizing process so that substantially no voids are present in the porous material at the bearing surface.

In the dynamic pressure bearing of this embodiment, the bearing surface is crushed by a sizing process so that substantially no voids are present in the bearing surface of the porous material. As a result, the airtightness of the bearing surface can be enhanced and sufficient dynamic pressure can be generated. Further, the material at the dynamic pressure grooves that has been fluidized by the rolling process is absorbed by the voids of their surrounding porous material. As a result, swells are not produced in the vicinity of the dynamic pressure grooves. Also, even if swells have been produced with the use of a porous material of high density, the swells in the vicinity of the dynamic pressure grooves on the bearing surface formed during the rolling process can be flattened by the sizing process.

BRIEF DESCRIPTION OF THE DRAWINGS

The present invention will become more fully understood from the detailed description given hereinbelow and the accompanying drawings which are given by way of illustration only, and thus do not limit the present invention, and wherein.

DETAILED DESCRIPTION OF THE PREFERRED EMBODIMENTS

Hereinbelow, the present invention is described in detail by an embodiment thereof illustrated in the accompanying drawings.

(First Embodiment)

Figure 1:
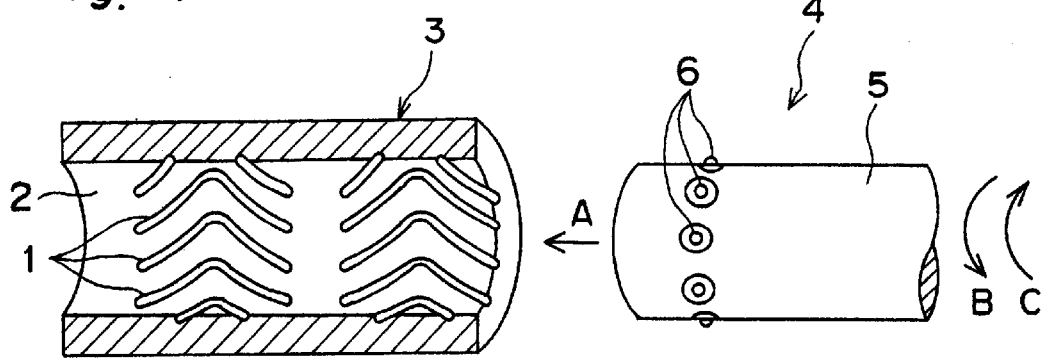
FIG. 1 is a cross-sectional perspective view of a sleeve formed with dynamic pressure grooves in a dynamic pressure bearing according to a first embodiment of the present invention.

FIG. 1 shows a sleeve 3 serving as a support member, in which a plurality of generally V-shaped dynamic pressure grooves 1 are formed at an inner circumferential surface 2. FIG. 1 also shows a rolling machine 4. The sleeve 3 is made of a sintered metal fabricated by compression molding metal powder, and a high temperature heating and solidification of the molded product. This sintered metal is an example of the porous material. The rolling machine 4, on the other hand, comprises cylindrical part 5 and a plurality of hemispherical protrusions 6 arranged at equal intervals circumferentially around the cylindrical part 5. The hemispherical protrusions 6 can be made to appear on (extend from) and disappear from the cylindrical part 5 by unshown pins or oil pressure. Further, the rolling machine 4 comprises an unshown feed device and turning device, so that the cylindrical part 5 of the rolling machine 4 can be inserted into the sleeve 3 and be turned in both a forward and reverse direction while staying inserted in the sleeve 3.

The dynamic pressure grooves of this dynamic pressure bearing are formed in the following manner.

With the sleeve 3 fixed, the feeding device of the rolling machine 4 is driven. The rolling machine 4 is moved in a direction of arrow A in FIG. 1 while making the central axis of the cylindrical part 5 and the central axis of the sleeve 3 coincident with each other so that the cylindrical part 5 is inserted into the sleeve 3. Also, the cylindrical part 5 is pushed into the sleeve 3 until the cylindrical part 5 reaches a specified position, where the plurality of hemispherical protrusions 6 are then extended from the outer circumferential surface of the cylindrical part 5 so as to be pushed into the sleeve 3. The place where this the protrusions are extended into the sleeve results in a point where the dynamic pressure grooves 1 start to be formed. Next, the cylindrical part 5, while being advanced, is turned in a direction indicated by arrow B in FIG. 1, i.e. counterclockwise as viewed looking toward the sleeve 3. Further, when the cylindrical part s has been moved up to a specified position while being advanced and turned, the cylindrical part 5 is turned in a reverse direction indicated by arrow C in FIG. 1, i.e., clockwise. As a result, the traces of the hemispherical protrusions 6 that extend into the sleeve 3 form generally V-shaped dynamic pressure grooves 1 as shown in FIG. 1. For an end of the formation of the dynamic pressure grooves 1, the hemispherical protrusions 6 are retracted into the cylindrical part 5. Thus, by advancing and turning the rolling machine 4 having the plurality of hemispherical protrusions 6, a plurality of dynamic pressure grooves 1 are formed. The grooves are formed simultaneously at the inner surface of the sleeve 3 with circumferentially fixed intervals therebetween.

Next, an unshown sizing machine larger than the diameter of the inner circumferential surface of the sleeve 3 is inserted into sleeve 3 in which the dynamic pressure grooves 1 are formed, and a sizing process is carried out. By this sizing process, the inner circumference of the sleeve is slightly increased in diameter, while the inner circumferential surface, i.e. bearing surface, of the sleeve formed with the dynamic pressure grooves is crushed. This causes any voids of the porous material in the bearing surface to substantially disappear. With sleeves made of nonporous ordinary metal material, there are some cases where swells are produced on the bearing surface in the vicinity of the dynamic pressure grooves formed in the rolling process. However, since the sleeve is made of porous material in the present invention, the material at the portions of the dynamic pressure grooves is absorbed by the voids of the porous material so that no swells are produced in the vicinity of the dynamic pressure grooves. When the porous material is of high density, some swells may be produced, but they are pressed and flattened by the sizing process.

Figure 2:
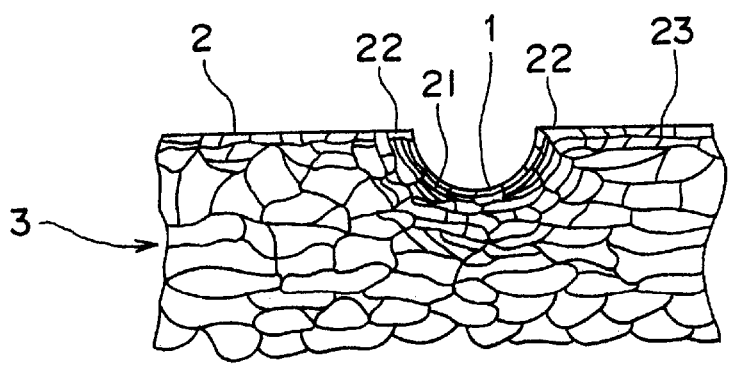
FIG. 2 is an enlarged sectional view of a dynamic pressure groove and a bearing surface of FIG. 1.

FIG. 2 is an enlarged sectional view of the sizing processed bearing surface 2 with the dynamic pressure grooves 1. Tissue 21 in proximity to a dynamic pressure groove 1 has been crushed so as to be made fine by rolling, the voids having been substantially eliminated. Also, tissue 23 under the bearing surface 2 has become a fine tissue crushed by the sizing process. Like this, voids among metal particles of the bearing surface 2 have been crushed so as to be made fine as in the dynamic pressure grooves 1, so that the bearing surface 2 has been enhanced in airtightness. Further, with the use of a porous material of high density, even if swells are produced in vicinity 22 of the dynamic pressure grooves 1 of the bearing surface 2 by the rolling process, these swells are pressed and flattened by the sizing process.

In this way, the dynamic pressure grooves 1 and the bearing surface 2 are formed in the sleeve 3 by rolling and sizing processes, respectively. Then, the radial dynamic pressure bearing according to the present embodiment is completed by inserting a shaft as a supported member, into the sleeve 3 as a supporting member.

In the dynamic pressure bearing of this embodiment, since the porous material at the surface of the dynamic pressure grooves 1 has substantially no voids, there is no possibility that the dynamic pressure fluid will leak out of the dynamic pressure grooves 1. Therefore, so that enough dynamic pressure can be generated.

Also, in the dynamic pressure bearing of this embodiment, the bearing surface 2 of the sleeve 3 with the dynamic pressure grooves 1 has been crushed by sizing. Therefore, substantially no voids are present in the porous material, and the bearing surface 2 can be maintained airtight. Further, since the material at the dynamic pressure grooves that has been formed for fluids by the rolling process is absorbed by the voids of their surrounding porous material, swells are not produced in the vicinity of the dynamic pressure grooves. Also, even if swells have been produced with the use of a porous material of high density, the swells in the vicinities of the dynamic pressure grooves 1 formed during the rolling process can be flattened by the sizing process.

(Second Embodiment)

Figure 3:
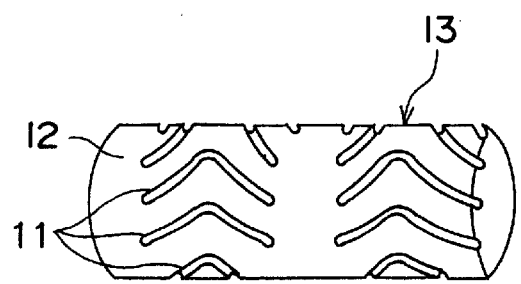
FIG. 3 is a perspective view of a shaft formed with dynamic pressure grooves in a dynamic pressure bearing according to a second embodiment of the present invention.

FIG. 3 shows a shaft 13 having a plurality of generally V-shaped dynamic pressure grooves 11 formed at its outer circumferential surface 12. This shaft 13 is made of a sintered metal which is a porous material. A rolling machine to be used, although not shown, has a plurality of hemispherical protrusions arranged at equal intervals circumferentially in an inner circumferential portion of a cylindrical member. As in the first embodiment, the hemispherical protrusions can be made to extend and retract while the rolling machine can be made to move and turn. The shaft 13 is inserted into this rolling machine, and the protrusions are extended and pushed into the outer circumferential surface 12 of the shaft 13. Then, the rolling machine is moved and turned, by which the dynamic pressure grooves 11 are formed in the outer circumferential surface 12. The bearing surface 12 is also sizing processed as in the first embodiment.

In this dynamic pressure bearing of the second embodiment, the porous material at the surface of the dynamic pressure grooves 11 has been crushed by rolling so that the voids have been eliminated as in the first embodiment. Therefore, the dynamic pressure fluid never leaks out of the dynamic pressure grooves 11 so that enough dynamic pressure can be generated. Also, since the bearing surface 12 has been crushed by the sizing process so that substantially no voids are present in the porous material, the bearing surface 12 is sufficiently airtight. Further, the dynamic pressure grooves 11 have no swells formed during the rolling process, being formed flat.

The above first and second embodiments have been described about radial bearings. However, thrust bearings with dynamic pressure grooves having substantially no voids in porous material can also be formed by a rolling process and a highly airtight, flat bearing surface can be obtained by a sizing process.

It is noted that sintered metal has been used for or the whole sleeve 3 or shaft 13 in the first and second embodiments. However, it is also possible to use sintered metal only for the surface part including the inner circumferential surface of the sleeve or the outer circumferential surface of the shaft. In addition, the porous material is not limited to sintered metal.

As apparent from the foregoing description, in the dynamic pressure bearing of the present invention, the dynamic pressure grooves of the supporting member or supported member made of porous material are formed by rolling process. The porous material at the surface of the dynamic pressure grooves has been crushed by the rolling process so that substantially no voids are present in the porous material at the surface of the grooves. Therefore, the dynamic pressure fluid never leaks out of the dynamic pressure grooves, so that enough dynamic pressure can be generated.

In the dynamic pressure bearing of an embodiment of the present invention, the bearing surface of the supporting member or supported member formed with the dynamic pressure grooves has been crushed by a sizing process. Therefore, substantially no voids are present in the porous material at the bearing surface. Therefore, the bearing surface can be maintained airtight. Further, since the material at the dynamic pressure grooves that has been made fluid by the rolling process is absorbed by the voids of their surrounding porous material, swells are not produced in the vicinity of the dynamic pressure grooves. Also, even if swells have been produced with the use of a porous material of high density, the swells in the vicinity of the dynamic pressure grooves formed during the rolling process can be made flat by the sizing process.

What is claimed is:

1. A dynamic pressure bearing comprising:

a supporting member; and a supported member;

wherein at least one of said supporting member and said supported member comprises a grooved member, said grooved member comprising a porous material and having a bearing surface and dynamic pressure grooves formed in said porous material;

wherein each of said dynamic pressure grooves has a crushed groove surface formed by a rolling process such that said crushed groove surface of each of said dynamic pressure grooves is free of voids; and wherein said bearing surface is a crushed bearing surface formed by a sizing process.

2. The dynamic pressure bearing of claim 1, wherein said dynamic pressure grooves comprise V-shaped dynamic pressure grooves.

3. The dynamic pressure bearing of claim 1, wherein said supporting member comprises said grooved member, said grooved member comprising a sleeve having an inner circumferential surface, said dynamic pressure grooves being formed on said inner circumferential surface.

4. The dynamic pressure bearing of claim 1, wherein said supporting member comprises said grooved member, said grooved member comprising a shaft having an outer circumferential surface, said dynamic pressure grooves being formed on said outer circumferential surface.

5. The dynamic pressure bearing of claim 1, wherein said supported member comprises said grooved member, said grooved member comprising a sleeve having an inner circumferential surface, said dynamic pressure grooves being formed on said inner circumferential surface.

6. The dynamic pressure bearing of claim 1, wherein said supported member comprises said grooved member, said grooved member comprising a shaft having an outer circumferential surface, said dynamic pressure grooves being formed on said outer circumferential surface.

7. A dynamic pressure bearing comprising:

a supporting member; and a supported member;

wherein at least one of said supporting member and said supported member comprises a grooved member, said grooved member comprising a porous material and having a bearing surface and dynamic pressure grooves formed in said porous material;

wherein each of said dynamic pressure grooves has a crushed groove surface formed by a rolling process such that said crushed groove surface of each of said dynamic pressure grooves is free of voids; and wherein said bearing surface is a crushed bearing surface free of voids.

8. The dynamic pressure bearing of claim 7, wherein said crushed bearing surface of said grooved member is formed by a sizing process.

9. The dynamic pressure bearing of claim 7, wherein said dynamic pressure grooves comprise V-shaped dynamic pressure grooves.

10. The dynamic pressure bearing of claim 7, wherein said supporting member comprises said grooved member, said grooved member comprising a sleeve having an inner circumferential surface, said dynamic pressure grooves being formed on said inner circumferential surface.

11. The dynamic pressure bearing of claim 7, wherein said supporting member comprises said grooved member, said grooved member comprising a shaft having an outer circumferential surface, said dynamic pressure grooves being formed on said outer circumferential surface.

12. The dynamic pressure bearing of claim 7, wherein said supported member comprises said grooved member, said grooved member comprising a sleeve having an inner circumferential surface, said dynamic pressure grooves being formed on said inner circumferential surface.

13. The dynamic pressure bearing of claim 7, wherein said supported member comprises said grooved member, said grooved member comprising a shaft having an outer circumferential surface, said dynamic pressure grooves being formed on said outer circumferential surface.

* * * * *